(12) United States Patent
Lee et al.

(10) Patent No.: US 8,310,204 B2
(45) Date of Patent: Nov. 13, 2012

(54) AUTOMATIC CHARGE EQUALIZATION METHOD AND APPARATUS FOR SERIES CONNECTED BATTERY STRING

(75) Inventors: Joong Hui Lee, Daejeon (KR); Soo Yeup Jang, Daejeon (KR); Jeon Keun Oh, Daejeon (KR); Gun Woo Moon, Daejeon (KR); Chong Eun Kim, Daejeon (KR); Hong Sun Park, Daejeon (KR); Chol Ho Kim, Daejeon (KR)

(73) Assignees: SK Innovation Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 332 days.

(21) Appl. No.: 12/738,333

(22) PCT Filed: Oct. 16, 2008

(86) PCT No.: PCT/KR2008/006105
§ 371 (c)(1),
(2), (4) Date: Apr. 16, 2010

(87) PCT Pub. No.: WO2009/051414
PCT Pub. Date: Apr. 23, 2009

(65) Prior Publication Data
US 2010/0207578 A1    Aug. 19, 2010

(30) Foreign Application Priority Data

Oct. 16, 2007  (KR) .................. 10-2007-0103983

(51) Int. Cl.
*H02J 7/00* (2006.01)
*H02J 7/04* (2006.01)

(52) U.S. Cl. ......... 320/118; 320/119; 320/120; 320/141

(58) Field of Classification Search ............... 320/118, 320/141
See application file for complete search history.

(56) References Cited

U.S. PATENT DOCUMENTS

| | | | |
|---|---|---|---|
| 5,631,534 A * | 5/1997 | Lewis | 320/103 |
| 5,659,237 A | 8/1997 | Divan et al. | |
| 5,710,504 A * | 1/1998 | Pascual et al. | 180/65.8 |
| 5,869,950 A | 2/1999 | Hoffman, Jr. et al. | |
| 6,140,800 A * | 10/2000 | Peterson | 320/118 |
| 6,150,795 A * | 11/2000 | Kutkut et al. | 320/118 |
| 6,583,602 B2 * | 6/2003 | Imai et al. | 320/118 |
| 2003/0141843 A1 * | 7/2003 | Anzawa et al. | 320/118 |
| 2007/0127274 A1 | 6/2007 | Bolz et al. | |
| 2007/0139006 A1 | 6/2007 | Yasuhito et al. | |
| 2007/0145946 A1 | 6/2007 | Chiang et al. | |
| 2009/0067200 A1 | 3/2009 | Bolz et al. | |

FOREIGN PATENT DOCUMENTS

| | | |
|---|---|---|
| EP | 0 432 639 B1 | 5/1995 |
| JP | 10-32936 A | 2/1998 |
| JP | 2004-194410 A | 7/2004 |
| JP | 2004215322 A | 7/2004 |

(Continued)

*Primary Examiner* — M'Baye Diao
(74) *Attorney, Agent, or Firm* — The Webb Law Firm

(57) ABSTRACT

The present invention relates to an automatic charge equalization apparatus and method having an automatic PWM generating means for a series-connected battery string. The automatic charge equalization method and apparatus for a series-connected battery string according to the present invention can improve charge equalization by accomplishing charge equalization operation after comparing the potential of the corresponding battery cell with the average potential of the plurality of battery cells including the corresponding battery cell upon charging or discharging the corresponding battery cell.

19 Claims, 15 Drawing Sheets

FOREIGN PATENT DOCUMENTS

| | | |
|---|---|---|
| KR | 1999-0037522 A | 5/1999 |
| KR | 10-2000-0057966 A | 9/2000 |
| KR | 2003-0080700 A | 10/2003 |
| KR | 2003-0096978 A | 12/2003 |
| KR | 10-2004-0017629 A | 2/2004 |
| KR | 10-2005-0004544 A | 1/2005 |
| KR | 10-2006-0061315 A | 6/2006 |
| KR | 10-2006-0083343 A | 7/2006 |
| KR | 10-2006-0087837 A | 8/2006 |
| KR | 10-2007-0006762 A | 1/2007 |
| KR | 10-2007-0030224 A | 3/2007 |
| KR | 10-2007-0031406 A | 3/2007 |
| KR | 10-2007-0064244 A | 6/2007 |
| KR | 10-0727002 B1 | 6/2007 |

* cited by examiner

[Prior Art]

(a)

(b)

Automatic PWM generation block (a)

(b)

AUTOMATIC CHARGE EQUALIZATION METHOD AND APPARATUS FOR SERIES CONNECTED BATTERY STRING

TECHNICAL FIELD

The present invention relates to an automatic charge equalization method and apparatus, more particularly, to an automatic charge equalization apparatus and method having an automatic PWM generating means for a series-connected battery string.

BACKGROUND ART

In a case that a potential higher than a basic potential of unit battery (cell) is necessary, such as a hybrid vehicle using a lithium ion cell as a power source, it is common to use a plurality of unit batteries which is connected in series. However, even though the batteries are produced with the same structure via a typical production method using the same anode, cathode and electrolyte material, a difference in charging or discharging (and self discharging) characteristics exists between each of the batteries connected in series.

Therefore, a potential difference can exist between the unit batteries when using the batteries connected in series.

Even if one battery of the unit batteries connected in series is perfectly discharged regardless of a potential of other battery, a total voltage (total voltage of batteries connected in series) becomes zero so that the battery is need to be recharged. Upon recharging the battery, since the potentials of the batteries are different from one another, there is a problem of over-charging in that the battery may reach a prescribed voltage in advance, as well as a problem of charge inefficiency in that some batteries may not reach the prescribed voltage even in an existence of an over-charging.

Further, if the number of charging/discharging times becomes large, degradation is caused in materials composing the battery and thus a property of the battery is varied, and as a result, such degradation situation is responsible for further increasing a difference in individual cells.

In order to address such problems, there are proposed various charge-equalization apparatuses which can accomplish charge equalization of the batteries connected in series.

As an example, Korean patent Laid-Open No. 2007-0031406 is directed to an apparatus and method for equalizing the charges of series-connected individual cells of an energy storage using a DC/DC converter to which the energy is supplied from the energy storage or other energy source, and more specifically, the DC/DC converter charges an intermediate circuit capacitor, and a voltage of the intermediate circuit capacitor is reversed by the DC/AC converter so that the alternating voltage is converted to a pulsed direct current by a rectifier through AC bus lines and combined transformer and the cell having lowest voltage is charged with the pulsed direct current.

Korean Patent Laid-Open 2007-0006762 is directed to an apparatus for equalizing charge of series-connected capacitors of 2-step capacitor (DLC) in which individual transformers Tr1 to Trn assigned to each of capacitors C1 to Cn respectively and a voltage comparator are provided and a secondary winding of the individual transformer is connected via the individual diodes D1 to Dn to an anode terminal of the capacitor and directly connected to a cathode terminal of the capacitor.

European Patent Registration No. EP 0432639 is directed to a charge equalizing apparatus which equalizes charge between low-charged battery and the remaining batteries if a plurality of batteries is connected in series by providing charging circuit including a rectangular-functional generator and a comparing circuit and diode, transformer and contact breaker, for each individual battery of a battery stack.

U.S. Pat. No. 5,659,237 is directed to a charge equalizing apparatus which equalizes charge of at least 2 series-connected energy storage cell, comprising a transformer having a primary winding and a secondary winding (herein, the secondary winding is connected to one of an energy storage cells), a forward converter for inducing the charging current in each of the secondary windings by applying the equalizing voltage signal to the primary winding of the transformer, and a means for increasing a magnitude of the voltage signal until the energy storage cells are equalized while charging lower cells.

Specifically, the prior technology can be represented as FIG. 1, in which batteries $B_1$ to $B_N$ are connected in series in a center portion and DC/DC converters 110_1 to 110_N are connected to every two adjoining batteries. The DC/DC converter is implemented in such a way to discharge the energy from top battery and charge the energy to bottom battery of the two adjoining batteries. In a case of undermost-located battery $B_1$, the DC/DC converter is implemented such that the discharged energy is charged to an uppermost-located battery $B_N$ of the series-connected battery string. The charge equalizing apparatus in FIG. 1 allows the charge equalization to be accomplished by moving charge from the top cell to the bottom cell of two adjoining cells when the charge imbalance is caused.

FIG. 2 shows an example of the charge equalizing apparatus having an automatic PWM generating means 210 for the nth cell. As shown in FIG. 2, a forward converter 220 is provided between two batteries $B_{n+1}$, $B_n$ connected in series, and an input of the forward converter is connected to the top cell and an output of the forward converter is connected to the bottom cell respectively. An anode terminal and a cathode terminal of a comparator 212 are connected to an average potential of the batteries and a potential of the nth battery $B_n$ respectively. An output of the comparator 212 is used to drive a PWM generator 211 and the PWM signal generated by the PWM generator 211 is used to drive the forward converter 220. In the charge equalizing apparatus having an automatic PWM generating means 210 shown in FIG. 2, the PWM signal is generated when the potential of the top cell $B_{n+1}$ is higher than that of the bottom cell $B_n$ of the two batteries connected in series, and the PWM signal operates the forward converter 220 and as a result, the charge equalization is accomplished in such a way that the charge is moved from the over-charged top cell to relatively low-charged bottom cell.

In the prior automatic charge equalizing apparatus, the charge equalization is accomplished in such a way that the charge is moved from the over-charged battery to relatively low-charged battery by comparing potentials of the two adjoining batteries. Herein, the automatic charge equalizing apparatus determines the potential of two adjoining batteries and initiates the charge equalization operation if the potential of the top battery is higher than that of the bottom battery. Therefore, the prior technology has limitations in that the charge is discharged from the cell having a low potential if two cells having relatively low potential of the series-connected battery string are adjoining. In other words, even though some adjoining cells are low-charged at the same time, since the charge equalizing apparatus is operated by determining the potential between the two adjoining cells, the energy can be discharged from the relatively low-charged battery cell. In order to address such problem, the charge equalizing apparatus can be structured such that the energy is discharged only if the potential of the current cell is higher by comparing the average potential of total battery cells and the average potential of the current cell of interest, which results from complexity of the charge equalizing apparatus.

DISCLOSURE

Technical Problem

An object of the present invention is to provide a charge equalization apparatus and method for a series-connected battery string which allow the energy not to be discharged from relatively low-charged battery cell by comparing it with an average potential of total batteries.

Further, other object of the present invention is to provide a charge equalization apparatus and method for series-connected battery string which can overcome a complexity of a charge equalization apparatus when the charge equalization apparatus is designed to be operated by comparing an average potential of total batteries with potential of a current battery cell of interest.

Technical Solution

A charge equalization apparatus for a series-connected battery string according to the present invention comprises a battery string consisted of a plurality of batteries connected in series; nth battery cell composing the battery string; a battery string of m which is one portion of the battery string and has m battery cells including the nth battery cell connected in series; an automatic PWM generating means connected in parallel to each of the batteries composing the battery string; and a charge equalizer connected in parallel to each of the batteries composing the battery string, wherein the automatic PWM generating means comprises a comparator and a PWM generator automatically generating a PWM signal by an output of the comparator, and the comparator generates an output by comparing a potential of the nth battery cell with an average potential of the battery string of m (localized average potential), and the charge equalizer is automatically controlled to charge or discharge the nth battery cell according to the PWM signal automatically generated by the PWM generator.

(where, the nth battery cell refers to any single battery of the plurality of series-connected batteries composing the battery string, and the m is at least 3 and up to the number (k) of total batteries composing the battery string.)

Preferably, two inputs of the comparator are a potential of nth battery cell and an average potential of the batteries composing the battery string of m, and the two inputs of the comparator are equipped with a resistor respectively, which compares the average potential of the battery string of m with the potential of the nth battery cell.

Preferably, the charge equalizer comprises a DC/DC converter connected in parallel to each of batteries composing the battery string.

Preferably, the DC/DC converter is a charge-type converter and has a total potential of the battery string of m as an input. At this time, the automatic PWM generating means generates the PWM signal if the potential of the nth battery cell is lower than the average potential of the battery string of m.

Preferably, the DC/DC converter is a discharge-type DC/DC converter. At this time, the automatic PWM generating means generates the PWM signal if the potential of the nth battery cell is higher than the average potential of the battery string of m.

Preferably, the DC/DC converter is operated under a control of the automatic PWM generating means.

Preferably, the nth battery cell belongs to each of the battery string of m in a range of at least 1 to up to m.

Preferably, two inputs of a comparator provided in a battery cell located in an end portion of the battery string are a potential of the battery cell and an average potential of the batteries composing the battery string.

A charge equalization method for a charge equalization apparatus for a series-connected battery string comprising a battery string consisted of a plurality of batteries connected in series; an automatic PWM generating means including a comparator connected in parallel to each of the batteries composing the battery string; and a charge equalizer including a DC/DC converter connected in parallel to each of the batteries composing the battery string comprises steps of (a) automatically generating a PWM signal by comparing a potential of nth battery cell composing the battery string with an average potential of the battery string of m which is one portion of the battery string and has m battery cells connected in series including the nth battery cell; and (b) controlling the charge equalizer to charge or discharge the nth battery cell according to the PWM signal.

(where, the nth battery cell refers to any single battery of the plurality of series-connected batteries composing the battery string, and the m is at least 3 and up to the number (k) of total batteries composing the battery string.)

Preferably, the operation of the DC/DC converter is controlled to be started and stopped according to the PWM signal in the step (b), and the nth battery cell is charged and discharged by operating a charge-type DC/DC converter or a discharge-type DC/DC converter.

At this time, an input or an output of the DC/DC converter is connected to the battery string of m, so that charging current of the nth battery cell is caused by total potential of the battery string of m and discharging current of the nth battery cell serves as total potential of the battery string of m.

Preferably, the PWM signal generated by the automatic PWM generating means is controlled according to an output of the comparator in the step (a), and two inputs of the comparator are a potential of the nth battery cell and an average potential of the batteries composing the battery string of m respectively, and the average potential of the battery string of m and the potential of the nth battery cell are compared using resistors connected to the two inputs respectively.

Preferably, the automatic PWM generating means generates the PWM signal if a potential of the nth battery cell is higher than an average potential of the battery string of m, in the step (a).

Preferably, the automatic PWM generating means generates the PWM signal if a potential of the nth battery cell is lower than an average potential of the battery string of m, in the step (a).

The charge equalization method and apparatus according to the present invention can accomplish charge equalization by comparing a potential of a corresponding battery cell with an average potential of a plurality of battery cells including the corresponding battery cell when charging or discharging the charge to/from the corresponding battery cell.

Further, the present invention can address prior problems in that the charge can be flowed in or flowed out from the corresponding battery cell if the battery is relatively lower or higher compared with the adjoining battery cells even if some adjoining battery cells are low-charged or over-charged.

DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

Figure 1:
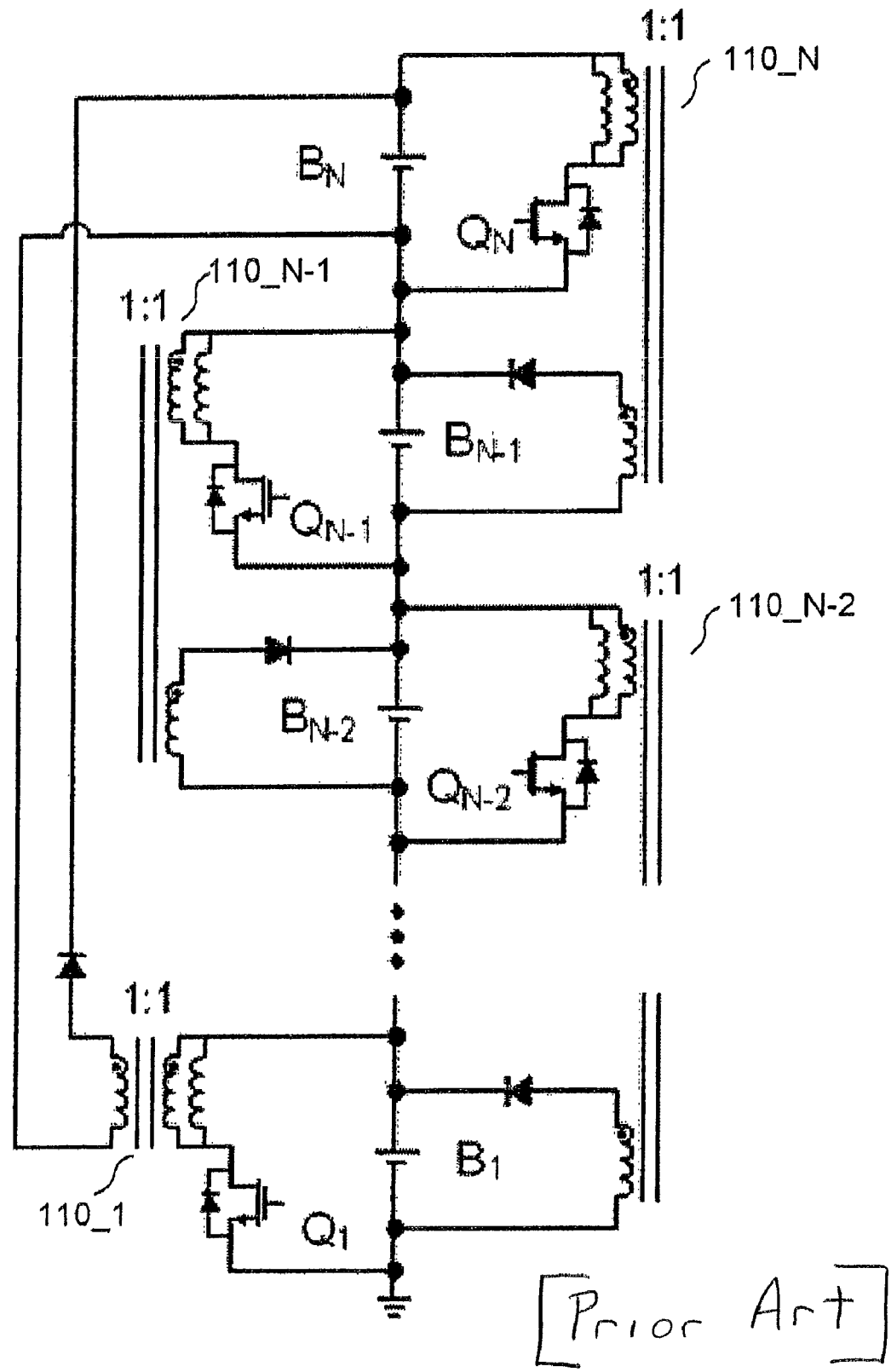
FIG. 1 is a diagram showing an example of prior automatic charge equalization apparatus.
Figure 2:
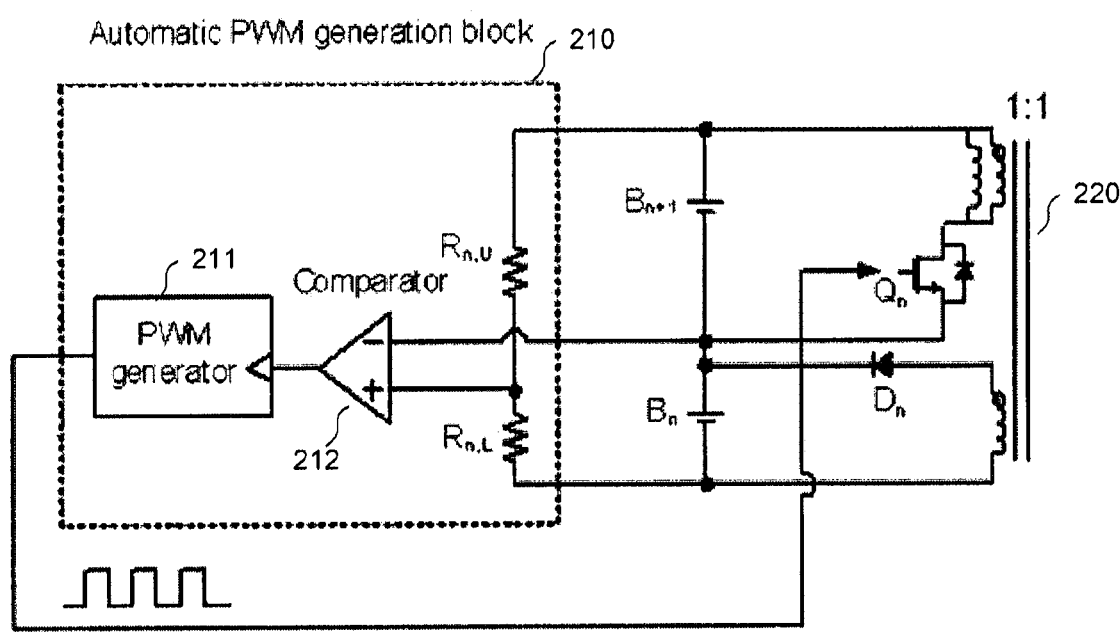
FIG. 2 is a diagram showing an example of a charge equalization apparatus having a prior automatic PWM generating means for the nth cell.

330: battery string of m
310, 610, 710, 810, 910, 1210, 1310, 1410, 1510: automatic PWM generating means
320, 620, 720, 820, 920, 1220, 1320, 1420, 1520: charge equalizer
410, 420, 430, 440, 1010, 1020, 1030, 1040: battery string with m=4

401: discharge-type charge equalizer
1001: charge-type charge equalizer

BEST MODE

Hereinafter, a charge equalization apparatus and method according to the present invention will be described in detail with reference to accompanying drawings. The accompanying drawings are provided as an example sufficiently to deliver an idea of the present invention to the person skilled in the art. Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

Figure 3:
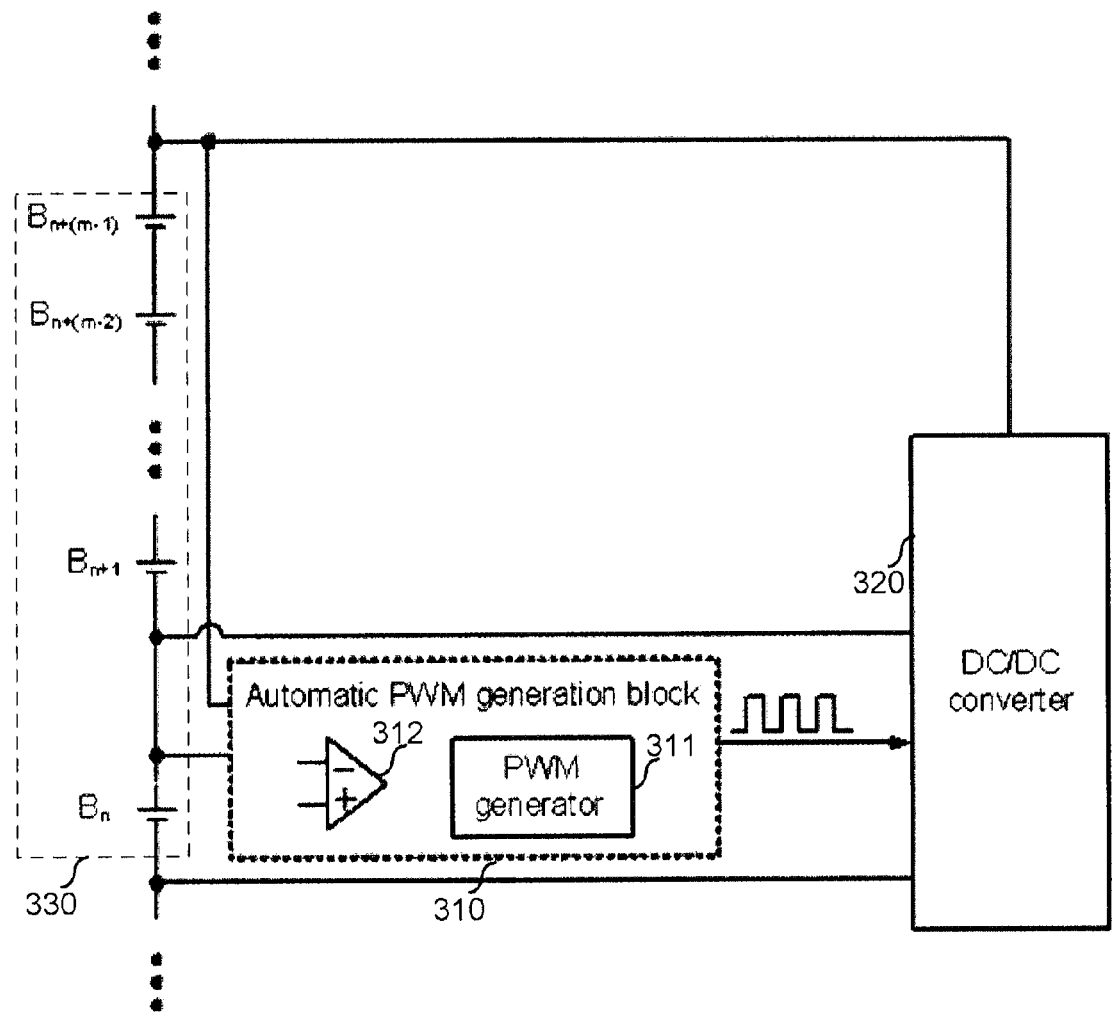
FIG. 3 is a diagram showing a general charge equalization apparatus for series-connected battery string according to one embodiment of the present invention.

FIG. 3 is a diagram showing a general structure of a charge equalization apparatus having an automatic PWM generating means 310 according to one embodiment of the present invention. As shown in FIG. 3, there is shown a battery string of m 330 having m batteries connected in series on the leftmost side. Herein, the battery string of m 330 is one portion of the series-connected battery string. A battery located at the undermost of the battery string of m is a current battery $B_n$. In FIG. 3, the nth battery cell means a battery cell in which the charge equalization induced by charging and discharging is accomplished, among any batteries composing the battery string of m 330. Further, the battery cell $B_{n+(m-1)}$ in the order of the same number as the number of the batteries composing the battery string of m 330 is called as the (n+(m−1))th battery. The battery string of m 330 is connected in parallel to an automatic PWM generating means 310. The automatic PWM generating means 310 includes a PWM generator 311 and a comparator 312 for generating the PWM generator 311. The charge equalizer 320 capable of charging or discharging the nth battery cell of current battery cell is controlled according to the PWM signal automatically generated by the PWM generator 311 to start or stop charging or discharging operation. As shown in FIG. 3, the charge equalizer 320 preferably comprises a DC/DC converter.

Referring to FIG. 3, the main features of the automatic charge equalization apparatus according to the present invention is that the DC/DC converter is controlled to be operated by the PWM signal generated at the PWM generator to cause the nth battery cell to be charged or discharged so that the charge equalization of the nth battery cell is accomplished, by comparing a potential of the nth battery cell with an average potential of m (m is at least 3 and up to the number of total batteries composing the battery string) battery cells including nth battery cell and generating the PWM signal automatically at the PWM generator by an output of the comparator.

Figure 4:
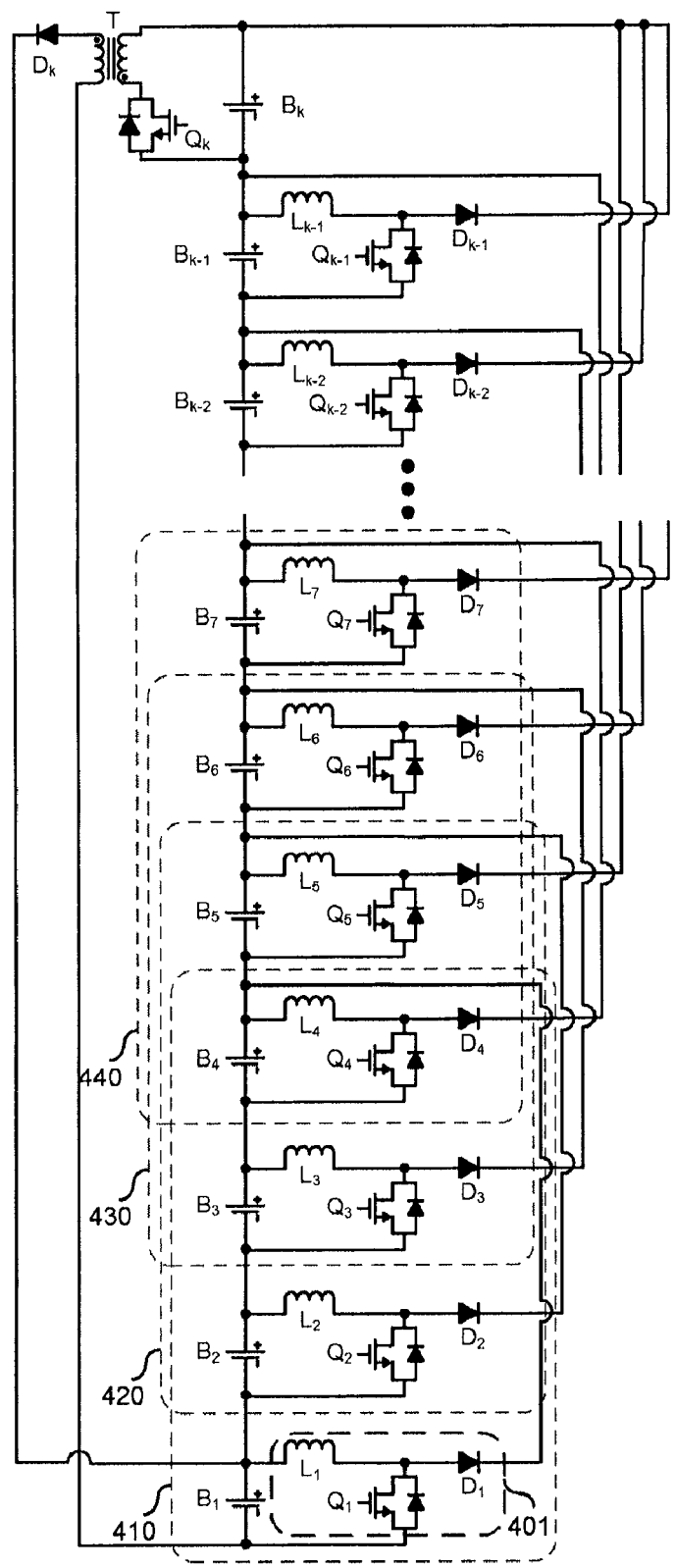
FIG. 4 is a diagram showing a discharge-type automatic charge equalization apparatus according to one embodiment of the present invention.

FIG. 4 is a diagram showing a discharge-type automatic charge equalization apparatus according to one embodiment of the present invention. The apparatus 401 capable of discharging the charge is connected in parallel to each battery cell of the battery string $B_1$ to $B_k$ having total k batteries connected in series. FIG. 4 shows the charge equalizing method of discharging over-charged energy and recharging it into upper m−1 batteries connected in series if a potential of any battery cell is higher than an average potential of 4 battery cells including itself, where m=4 in the battery string of m.

If the number of batteries to be charged is lower than m−1 (the number of batteries to be charged is lower than 3 in FIG. 4), most batteries can be charged. As shown in FIG. 4, the energy discharged from the (k−2)th battery cell $B_{k-2}$ is charged into the (k−1)th battery cell $B_{k-1}$ and the kth battery cell $B_k$ and the energy discharged from the (k−1)th battery cell $B_{k-1}$ is charged into the kth battery cell $B_k$. And, the energy discharged from the kth battery cell $B_k$ is charged into a battery cell $B_1$ located undermost of batteries connected in series.

Figure 5:
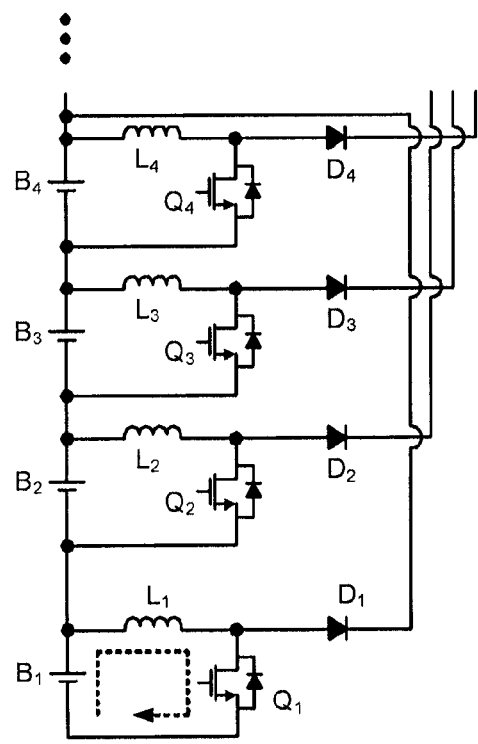
FIG. 5 is a diagram showing a flow of the charge (a) if $Q_1$ is on and (b) if $Q_1$ is off, in charge equalization procedures of the first battery in the automatic charge equalization apparatus according to one embodiment of the present invention.
Figure 5:
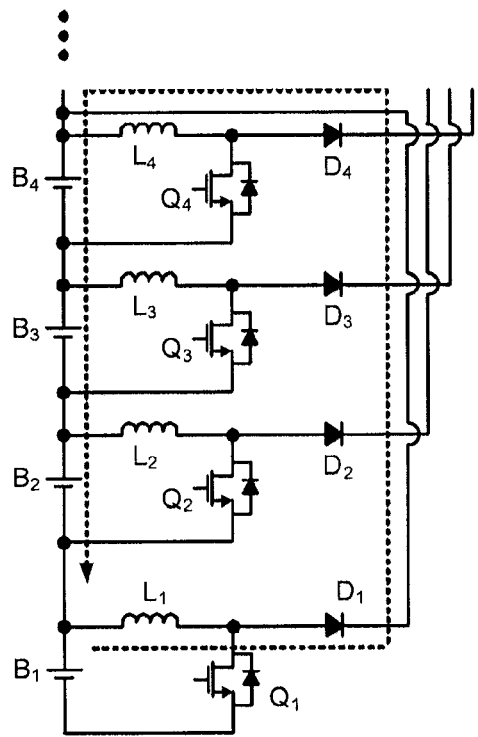

FIG. 5 shows charge equalizing procedures of the first battery cell $B_1$ in the automatic charge equalization apparatus according to one embodiment of the present invention based on FIG. 4. If a switch $Q_1$ is turned on, the energy discharged from the first battery cell $B_1$ is stored in an inductor $L_1$. Thereafter, if the switch $Q_1$ is turned off, the stored energy is entered into a second, third and fourth battery $B_2$, $B_3$ and $B_4$ connected in series via a diode $D_1$ (a dotted line arrow of FIG. 5 express a movement of charge according to operational states of the switch).

Figure 6:
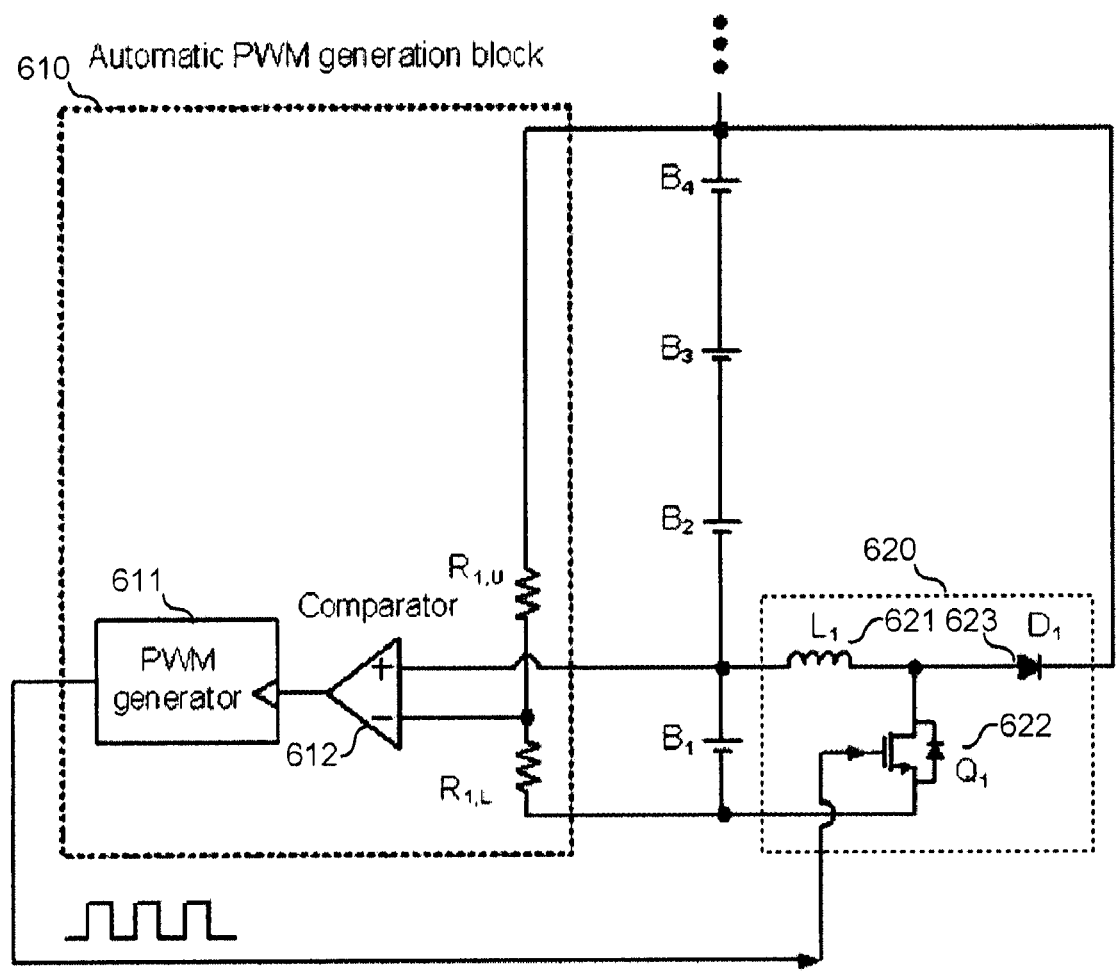
FIG. 6 is a diagram showing a discharge-type charge equalization apparatus having an automatic PWM generating means according to one embodiment of the present invention.

FIG. 6 is a diagram showing a discharge-type charge equalization apparatus having an automatic PWM generating means using a localized average potential according to one embodiment of the present invention. The localized total potential means a total potential of the battery string of m, and the localized average potential means an average potential of m batteries composing the battery string of m.

In order to overcome a disadvantage of prior charge equalization method which operates the charge equalizing apparatus by comparing between potentials of two adjoining battery cells, a method of operating the charge equalization apparatus is proposed if a potential of the current battery cell $B_1$ is higher than an average potential of m battery cells by comparing the battery cell $B_1$ of interest with the localized average potential of up to upper (m−1)th battery cell $B_4$ based on the current battery cell $B_1$ including the current battery cell $B_1$.

More specifically, FIG. 6 shows the battery string with m=4, including a discharge-type charge equalizer 620 for discharging over-charged energy of the first battery cell $B_1$ and an automatic PWM generating means 610 for operating the charge equalizer 620. An anode and a cathode of the comparator 612 within the automatic PWM generating means is connected to the potential of the first battery cell $B_1$ and the average potential of the first battery cell $B_1$ to the fourth battery cell $B_4$ respectively. Herein, the localized average potential of the first battery cell $B_1$ to the fourth battery cell $B_4$ is implemented using resistors $R_{1,U}$ and $R_{1,L}$, where a resistance value of $R_{1,U}$ is $3 \times R_{1,L}$ because it is the battery string with m=4. The output of the comparator 612 is connected to the PWM generator 611 so that the PWM generator 611 generates a PWM signal if the output of comparator 612 is high. The PWM signal has a fixed duty ratio to control operation of the charge equalizer 620 comprising a discharge-type DC/DC converter 621, a switch $Q_1$ 622 for driving the discharge-type DC/DC converter and a diode $D_1$ 623 for controlling flowing direction of current. In the charge equalizer 620 shown in FIG. 6, if the potential of the first battery cell $B_1$ is higher than the localized average voltage of the first battery cell $B_1$ to the fourth battery cell $B_4$, the switch $Q_1$ 622 becomes on by the PWM signal so that the charge equalizer 620 is operated, and subsequently the energy discharged from the first battery cell $B_1$ is charged into the second battery cell $B_2$, the third battery cell $B_3$ and the fourth battery cell $B_4$ in series. Such charge equalization operation continues until the potential of the first battery cell $B_1$ is lower than the localized average potential of up to the fourth battery cell $B_4$ including itself.

Figure 7:
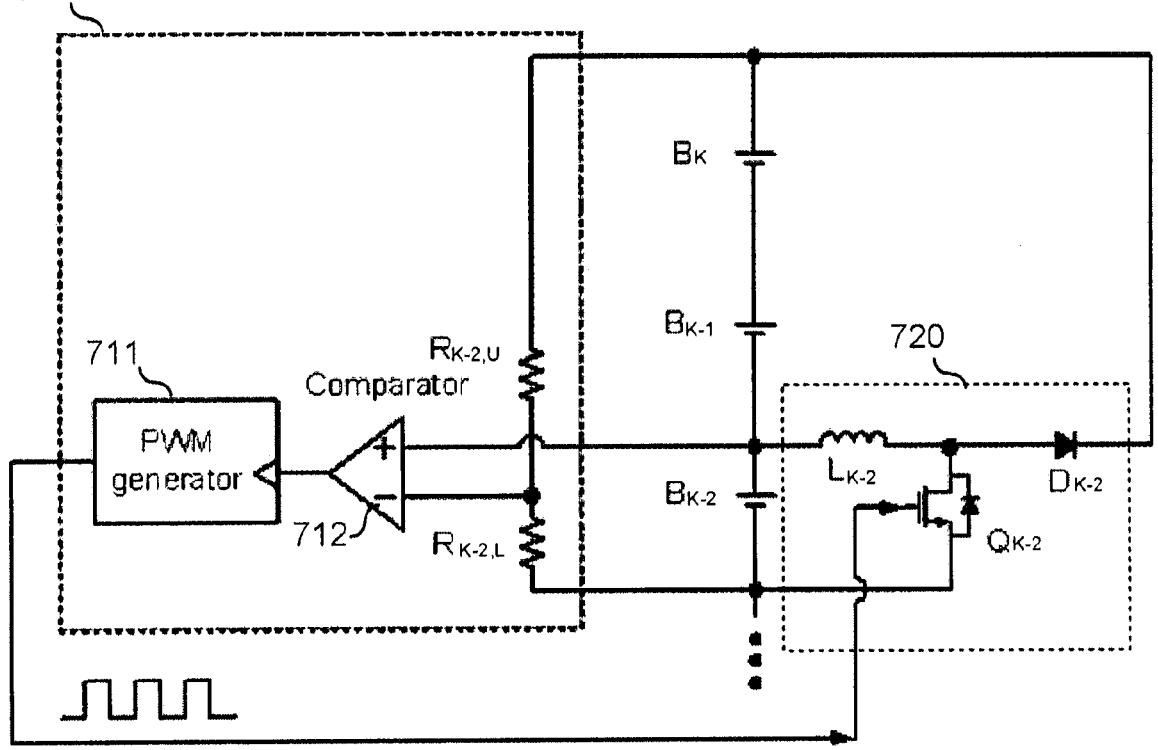
FIG. 7 is a diagram showing a discharge-type charge equalization apparatus having an automatic PWM generating means for the (N−2)th battery according to one embodiment of the present invention.

FIG. 7 is a diagram showing a discharge-type charge equalization apparatus having an automatic PWM generating means 710 for the (k−2)th battery according to one embodiment of the present invention based on FIG. 4. Considering the automatic charge equalization apparatus for the battery string of m where total number of batteries is k and m equals 4, the number of the batteries to be charged with the energy discharged from the (k−2)th battery cell $B_{k-2}$ is 2 at maximum. The batteries capable of being charged are the (k−1)th battery cell $B_{k-1}$ and the kth battery cell $B_k$. In this case, a relation of $R_{k-2, U} = 2 \times R_{k-2, L}$ is established. With respect to operation of the charge equalizer 720 in FIG. 7, if the potential of the (k−2)th battery cell $B_{k-2}$ is higher than average potential of the (k−2)th battery cell $B_{k-2}$ to the kth battery cell $B_k$, a PWM signal is generated by the automatic PWM generating means 710. The generated PWM signal is input to the switch $Q_{k-2}$ to drive the charge equalizer 720 and, as a result, the energy discharged from the (k−2)th battery cell $B_{k-2}$ is charged into two battery cells $B_{k-1}$ and $B_k$.

Figure 8:
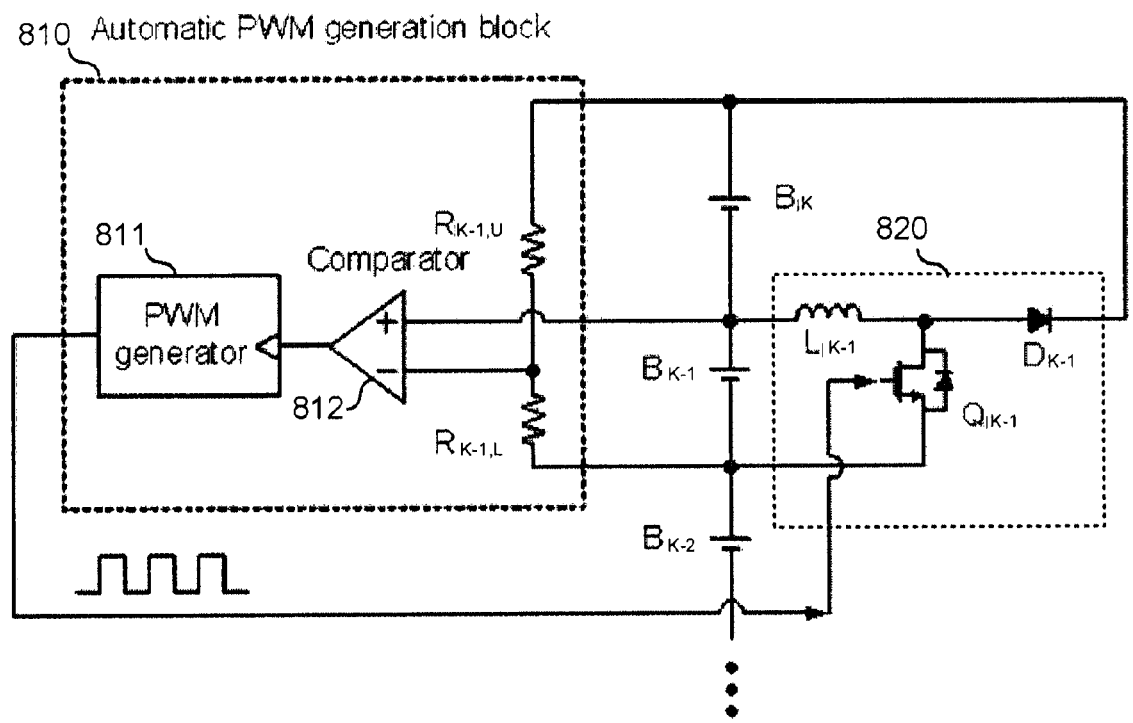
FIG. 8 is a diagram showing a discharge-type charge equalization apparatus having an automatic PWM generating means for the (N−1)th battery according to one embodiment of the present invention.

FIG. 8 is a diagram showing a discharge-type charge equalization apparatus having an automatic PWM generating means 810 for the (k−1)th battery according to one embodiment of the present invention based on FIG. 4. Considering the automatic charge equalization apparatus for the battery string of m where total number of batteries is k and m equals 4, the battery into which the energy discharged from the (k−1)th battery cell $B_{k-1}$, is entered is only kth battery cell $B_k$. In this case, a relation of $R_{k-1, U} = 2 \times R_{k-1, U}$ is established. With respect to operation of the charge equalization apparatus in FIG. 8, if the potential of the (k−1)th battery cell $B_{k-1}$ is higher than the potential of the kth battery cell, a PWM signal is generated by the automatic PWM generating means 810. The generated PWM signal is input to the switch $Q_{k-1}$ to drive the charge equalizer 820 and, as a result, the energy discharged from the (k−1)th battery cell $B_{k-1}$ is charged into the battery cell $B_k$.

Figure 9:
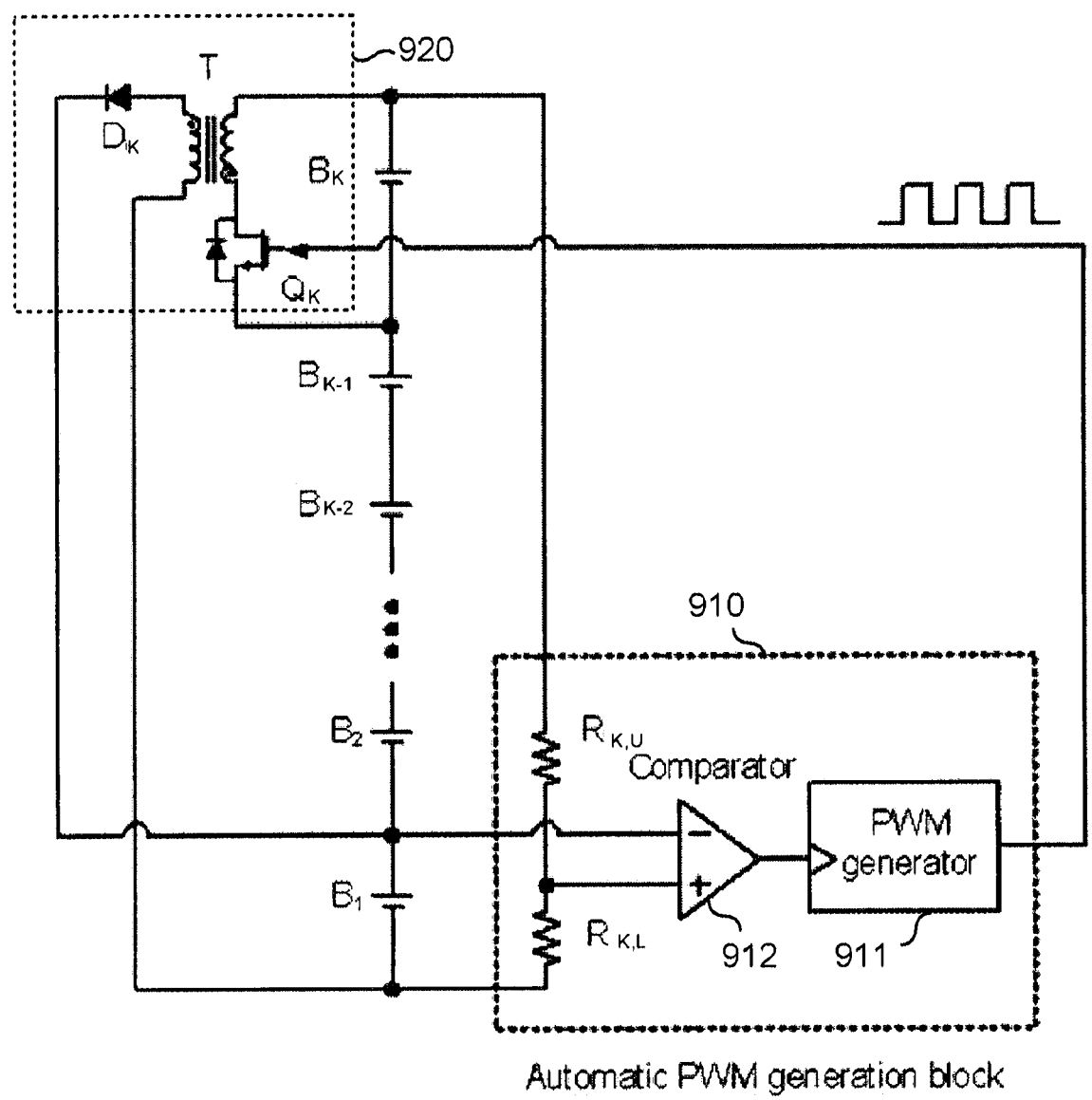
FIG. 9 is a diagram showing a discharge-type charge equalization apparatus having an automatic PWM generating means for the Nth battery according to one embodiment of the present invention.

FIG. 9 is a diagram showing a discharge-type charge equalization apparatus having an automatic PWM generating means 910 for kth battery according to one embodiment of the present invention based on FIG. 4. If total number of batteries is k and m equals 4, the energy discharged from kth battery cell $B_k$ is charged into the first battery cell $B_1$ located in the undermost of k batteries connected in series. A cathode terminal and an anode terminal of the comparator 912 of the automatic PWM generating means 910 is connected to the potential of the first battery cell $B_1$ and the average potential of total potential of the battery string respectively. In two resistors $R_{k, U}$ and $R_{k, L}$, the relation of $R_{k, U} = (k-1) \times R_{k, L}$ is established. With respect to operation of the charge equalizer 920 in FIG. 9, if the potential of the first battery cell $B_1$ is lower than the potential of total k batteries, the automatic PWM generating means 910 is operated to generate the PWM signal. The generated PWM signal is input to the switch $Q_k$ to drive the charge equalizer 920, and, as a result, the energy discharged from the kth battery cell $B_k$ is charged into the first battery cell $B_1$.

Figure 10:
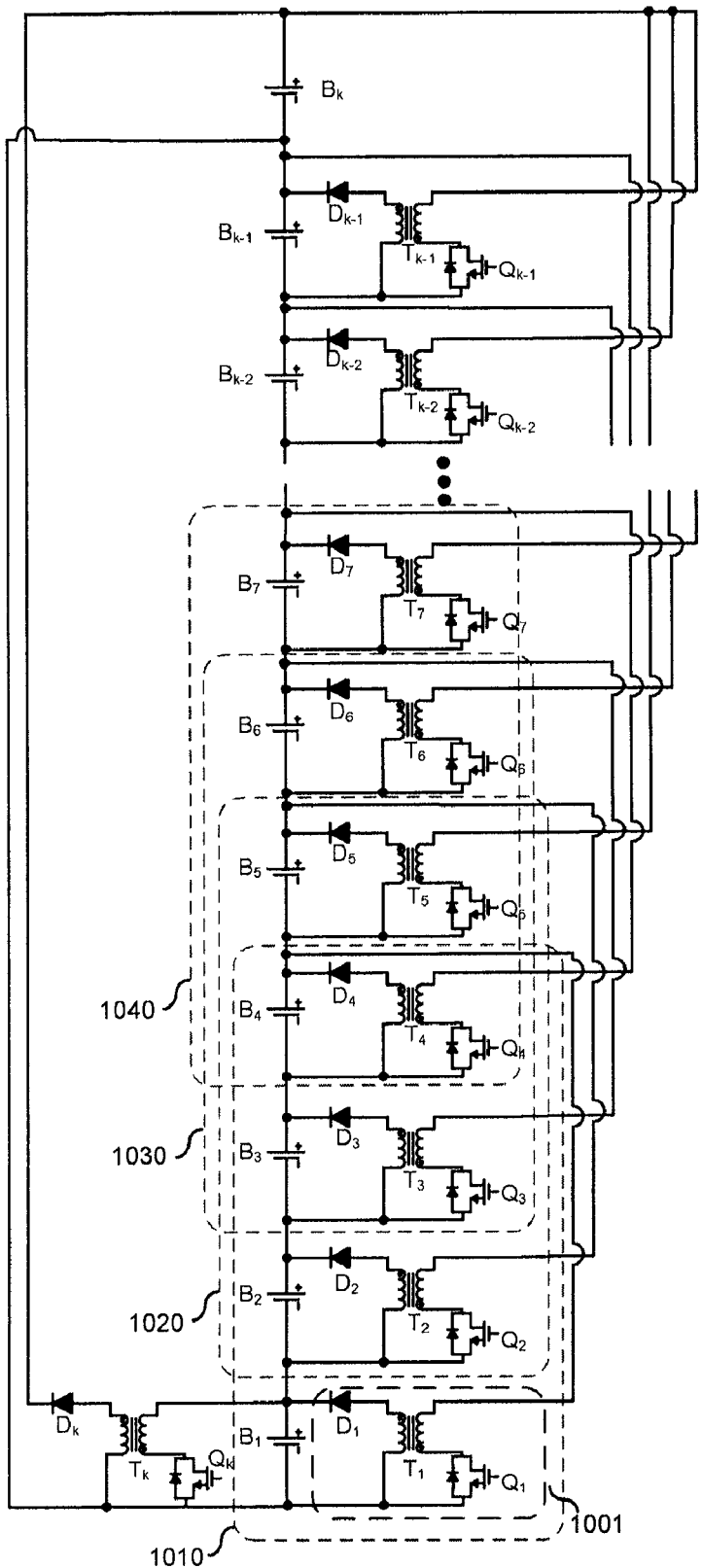
FIG. 10 is a diagram showing a charge-type charge equalization apparatus according to other embodiment of the present invention.

FIG. 10 is a diagram showing a charge-type charge equalization apparatus according to other embodiment of the present invention. The charge equalization apparatus has k batteries $B_1$ to $B_k$ connected in series in a central portion, and the charge-type charge equalizer 1001 capable of charging the energy into the corresponding battery cell connected in parallel to all battery cells. FIG. 10 shows the charge equalization method of charging the energy discharged from 4 battery cells into one battery located in the undermost, showing the battery string of m 1010, 1020, 1030 1040 of k batteries $B_1$ to $B_k$ connected in series where m=4. In FIG. 10, battery cells of the first battery cell $B_1$ to the (k−3)th battery cell $B_{k-3}$ in k batteries connected in series can be implemented as a general form of the present invention. But, in a case of the (k−2)th battery cell $B_{k-2}$, the (k−1)th battery cell $B_{k-1}$ and the kth battery cell $B_k$ are discharged to charge the (k−2)th battery cell, and only the kth battery cell $B_k$ is discharged to charge the (k−1)th battery cell $B_{k-1}$. The first battery cell $B_1$ located in the undermost is discharged to charge the kth battery cell $B_k$ located in the uppermost. In FIG. 10, a simple flyback converter is used as the charge-type charge equalization apparatus for charging the corresponding battery cell if the battery cell of interest is low-charged. However, it is apparent to the person skilled in the art that DC/DC converter of another type can be used for the same purpose.

Figure 11:
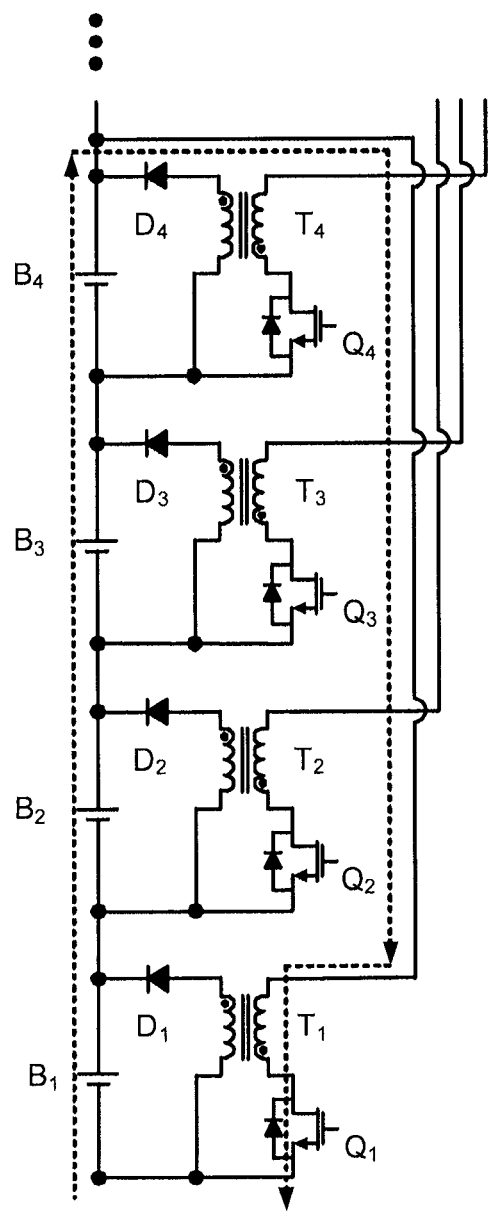
FIG. 11 is a diagram showing a flow of the charge (a) if $Q_1$ is on and (b) if $Q_1$ is off, in charge equalization procedures of the first battery in a charge-type automatic charge equalization apparatus according to other embodiment of the present invention.
Figure 11:
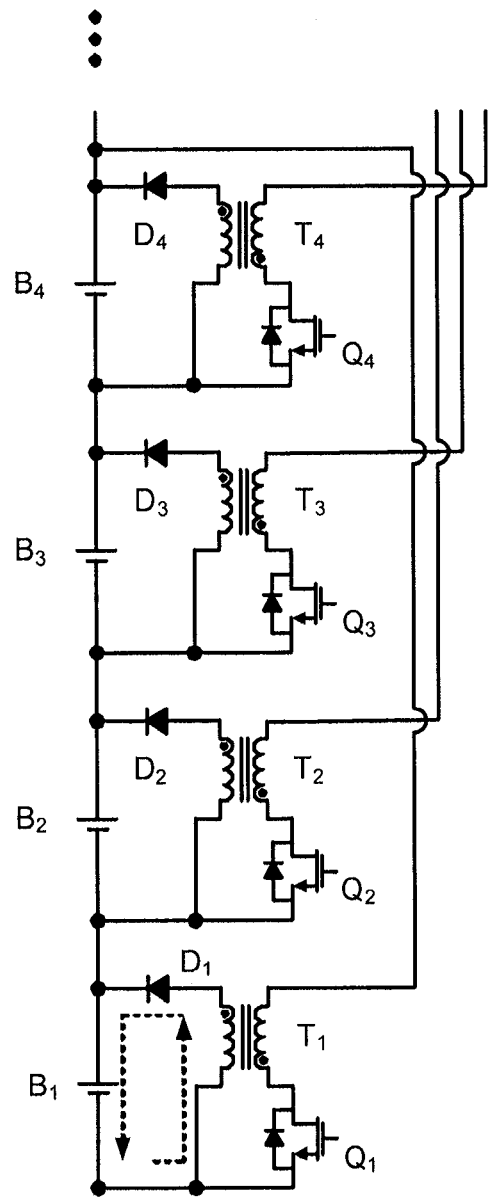

FIG. 11 is a diagram showing charge equalization procedure of the first battery cell $B_1$ in the automatic charge equalization apparatus according to other embodiment of the present invention based on FIG. 10. The charge-type charge equalizer 1110 comprises a transformer, a diode and switching element (FET, BJT). The first battery $B_1$ in FIG. 11 is connected in parallel to the transformer $T_1$ having a secondary winding connected in series to the diode. A primary winding of the transformer T1 is connected in series to the switch $Q_1$ and thus connected in parallel to a localized total potential of the battery string of m, i.e., an anode of the fourth battery cell $B_4$ and a cathode of the first battery cell $B_1$. If the switch $Q_1$ is turned on by the PWM driving signal generated by the automatic PWM generating means (not shown), the energy is stored in a magnetizing inductor of the If the switch $Q_1$ is turned off, the energy stored at the magnetizing inductor is entered into the first battery cell $B_1$ via the diode D1.

Figure 12:
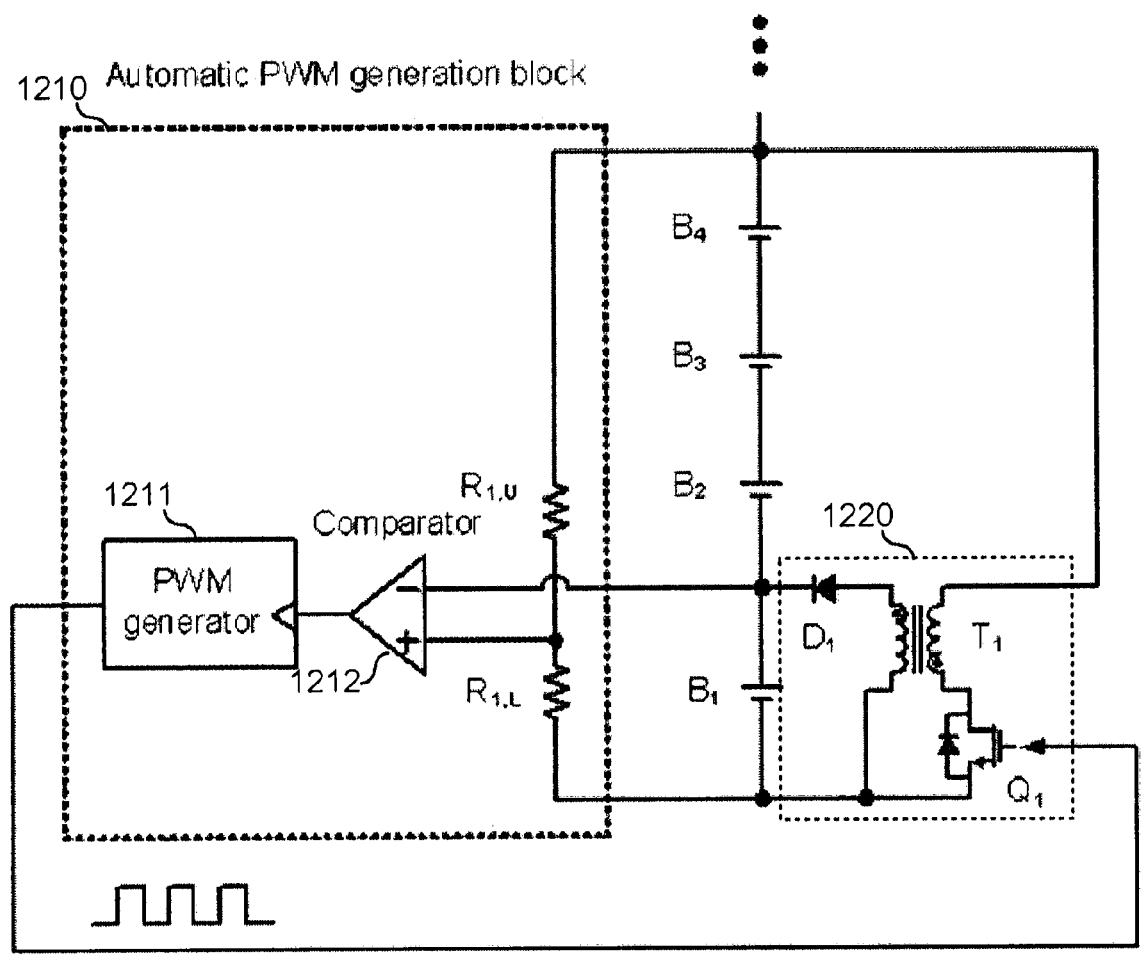
FIG. 12 is a diagram showing a charge-type charge equalization apparatus having an automatic PWM generating means according to other embodiment of the present invention.

FIG. 12 is a diagram showing a charge-type charge equalizer 1220 along with an automatic PWM generating means 1210 for charge equalization of the first battery according to other embodiment of the present invention based on FIG. 10. Since it shows the battery string of m where m=4, 4 batteries of the first battery cell $B_1$ to the fourth battery cell B4 are connected in series and a flyback converter is connected in parallel to the first battery cell $B_1$ to charge the first battery cell $B_1$. Specifically, an input of the flyback converter is connected to a localized total potential of the battery string of m where m=4 and an output of it is connected to the first battery cell $B_1$. The automatic PWM generating means 1210 is provided on left side of the battery and comprises a comparator 1212 and a PWM generator 1211. A cathode terminal and an anode terminal of the comparator 1212 is connected to a potential of the first battery cell $B_1$ and a localized total potential of the battery string of m respectively, where m=4. At this time, each of two input sides (cathode and anode terminals) of the comparator 1212 is equipped with resistors $R_{1,U}$ and $R_{1,L}$ respectively, so that the localized average potential of the battery string of m is compared with a potential of the single battery cell. For the purpose of it, $R_{1,U}$ and $R_{1,L}$ have a relation of $R_{1,U}=3\times R_{1,L}$.

Specifically explaining an operation of the charge equalizer 1220 along with the automatic PWM generating means 1210 shown in FIG. 12, if a potential of the first battery cell $B_1$ is lower than the localized average potential of the battery string of m where m=4, the PWM generating means 1210 generates a PWM signal having a fixed duty ratio, and the PWM signal is input to the switch $Q_1$ for driving the charge equalizer 1220. As a result, the energy flowed out from 4 battery cells $B_1$ to $B_4$ connected in series is entered into the first battery cell $B_1$. Such charge equalization procedure continues until the potential of the first battery cell $B_1$ becomes higher than the localized average potential of the battery string of m inputted to an anode terminal of the comparator 1212 where m=4.

Figure 13:
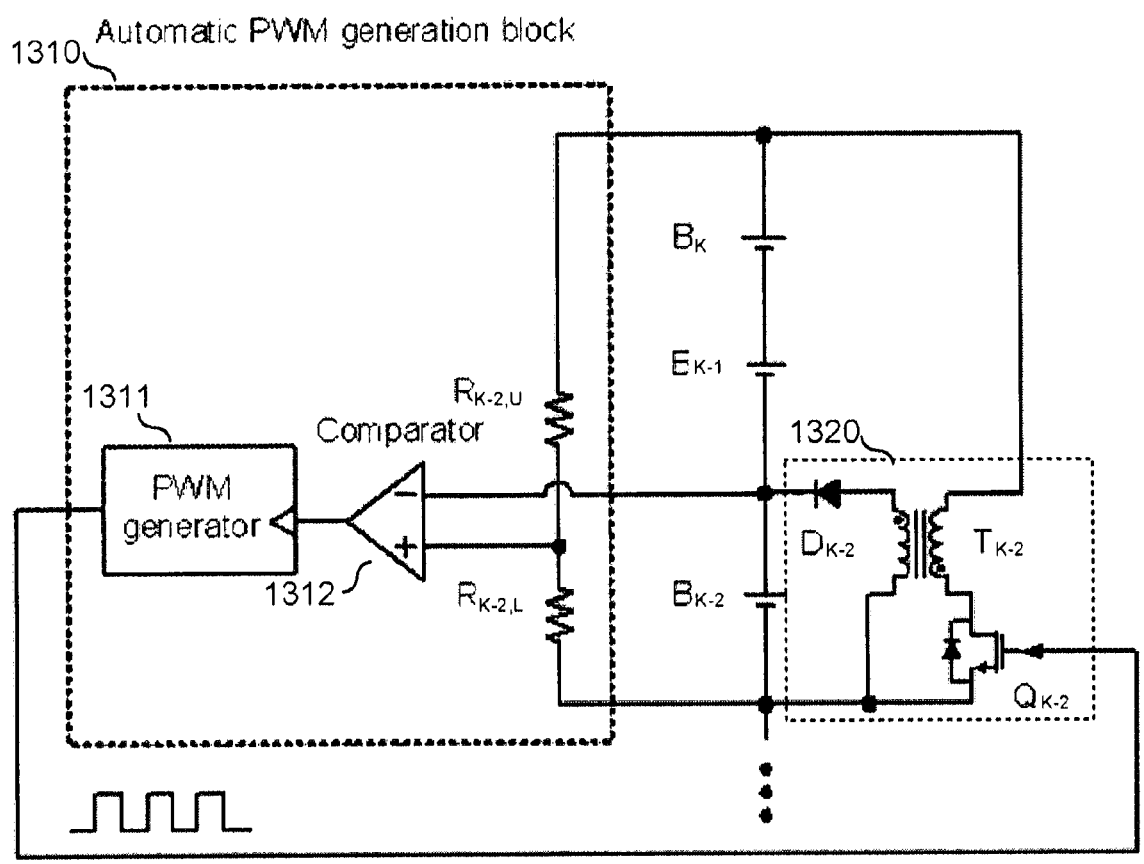
FIG. 13 is a diagram showing a charge-type charge equalization apparatus having an automatic PWM generating means for the (N−2)th battery according to other embodiment of the present invention.

FIG. 13 is a diagram showing a charge-type charge equalization apparatus 1320 along with an automatic PWM generating means 1310 for the (k−2)th battery cell $B_{k-2}$ according to other embodiment of the present invention based on FIG. 10. Supposing that total number of batteries is k, if the charge-type automatic charge equalization method is applied according to the present invention if m=4, the number of batteries capable of charging the (k−2)th battery cell $B_{k-2}$ is 2 at maximum. The batteries to be discharged are (k−1)th battery cell $B_{k-1}$ and kth battery cell $B_k$. In this case, a relation of $R_{k-2,U}=2\times R_{k-2,L}$ is established. With respect to operations of the charge equalizer 1320 along with the automatic PWM generating means 1310, if a potential of the (k−2)th battery cell $B_{k-2}$ is lower than an average potential of the (k−2)th battery cell $B_{k-2}$ to kth battery cell $B_k$, a PWM signal is generated by the automatic PWM generating means 1310. The generated PWM signal is input to the switch $Q_{k-2}$ to drive the charge equalizer. As a result, the energy discharged from 3 battery cells $B_{k-2}$, $B_{k-1}$, $B_k$ is charged into only (k−2)th battery cell $B_{k-2}$.

Figure 14:
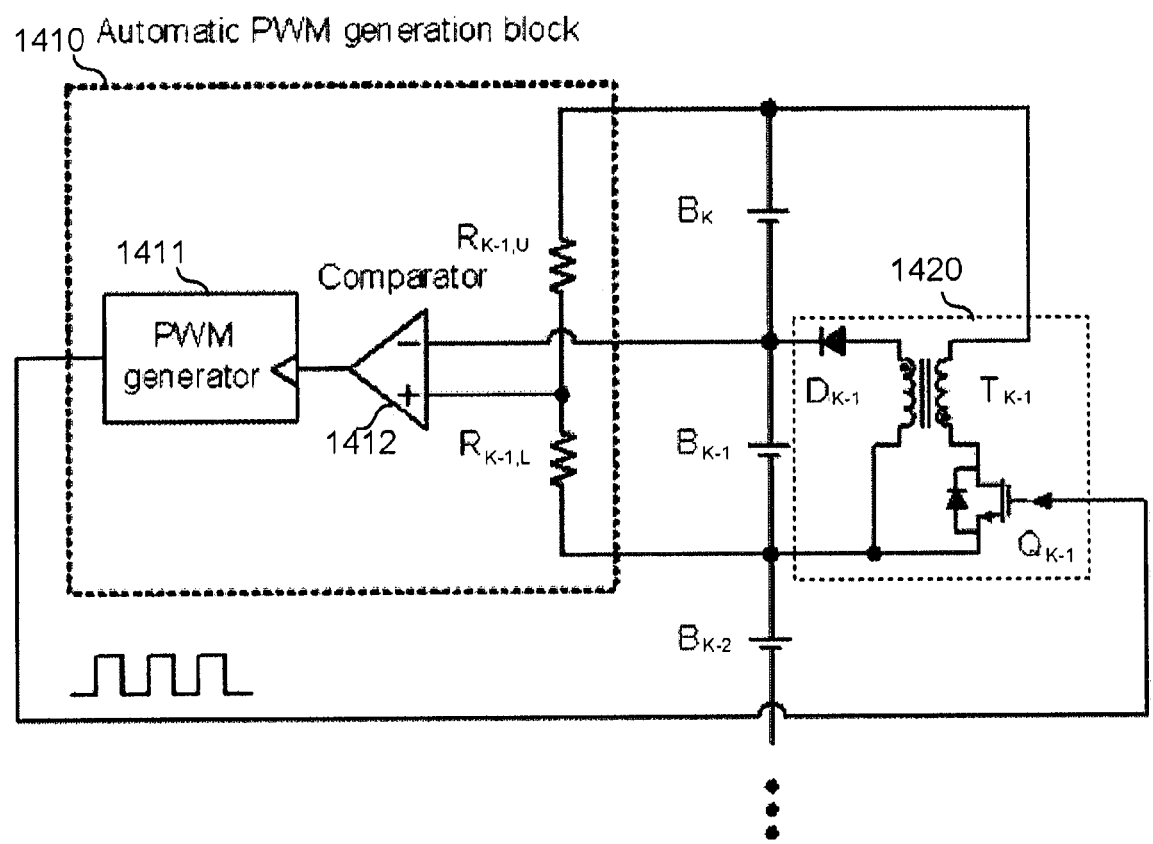
FIG. 14 is a diagram showing a charge-type charge equalization apparatus having an automatic PWM generating means for the (N−1)th battery according to other embodiment of the present invention.

FIG. 14 is a diagram showing a charge-type charge equalizer 1420 along with an automatic PWM generating means 1410 for the (k−1)th battery cell $B_{k-1}$ according to other embodiment of the present invention based on FIG. 10. Supposing that the number of total battery is k, the battery capable of charging the (k−1)th battery cell $B_{k-1}$ is only kth battery cell $B_k$ if m=4. In this case, a relation of $R_{k-1,U}=R_{k-1,L}$ is established. Explaining simple charge equalization procedure, the potential of the (k−1)th battery cell $B_{k-1}$ is lower than the potential of kth battery cell $B_k$, the automatic PWM generating means 1410 is operated to generate a PWM signal. The generated PWM signal is input to the switch $Q_{k-1}$ to drive the charge equalizer 1420. As a result, the energy discharged from two battery cells $B_{k-1}$, $B_k$ connected in series is charged only by the (k−1)th battery cell $B_k$.

Figure 15:
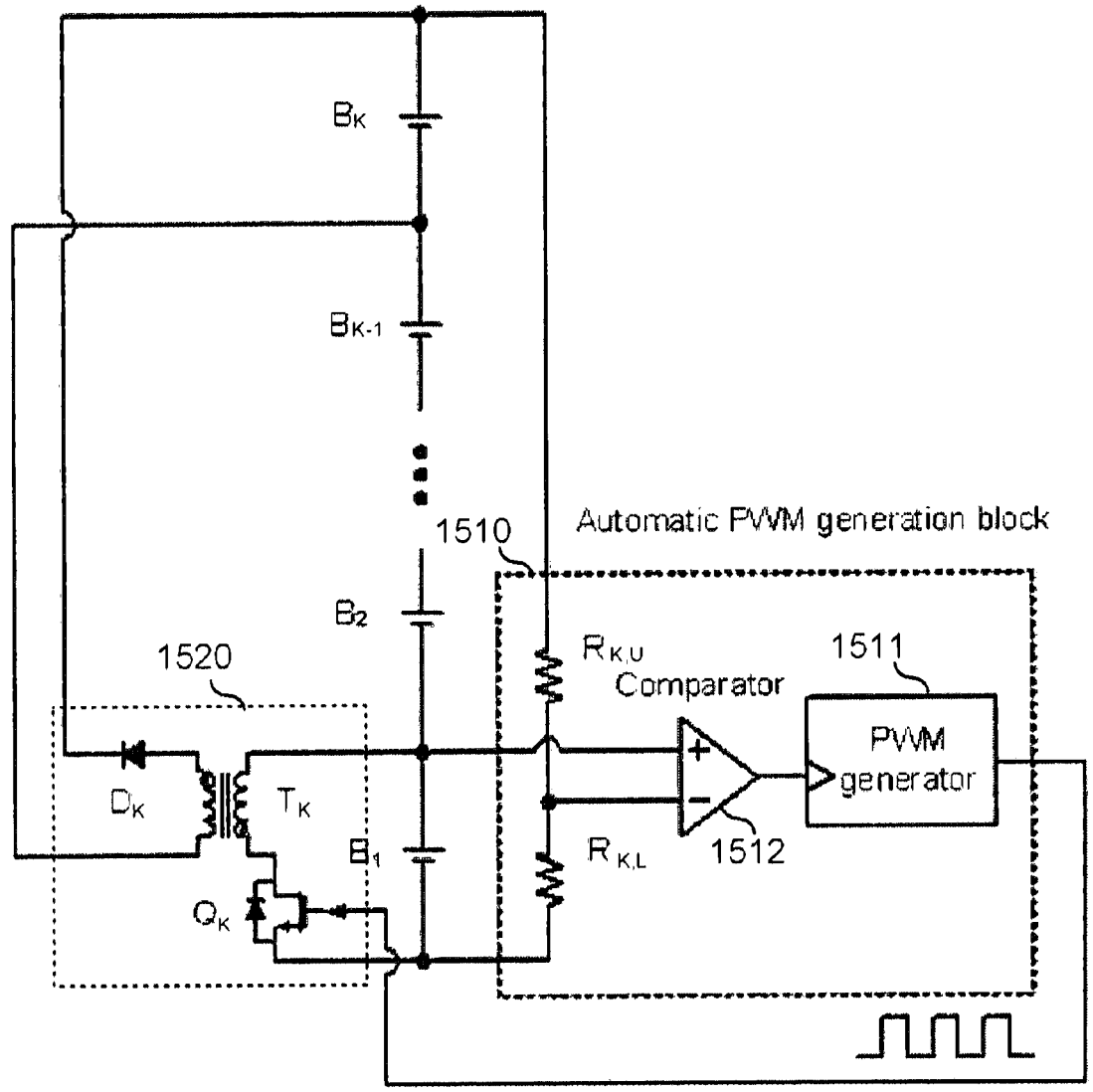
FIG. 15 is a diagram showing a charge-type charge equalization apparatus having an automatic PWM generating means for the Nth battery according to other embodiment of the present invention.

FIG. 15 is a diagram showing a charge-type charge equalization apparatus 1520 along with an automatic PWM generating means 1510 for kth battery according to other embodiment of the present invention based on FIG. 10. As shown in FIG. 15, the total battery string has k batteries $B_1$ to $B_k$ connected in series, and the first battery cell $B_1$ is located in the undermost and the kth battery cell $B_k$ is located in the uppermost. The flyback converter is implemented for charge equalization of kth battery cell $B_k$, and an input of the flyback converter is connected to the first battery cell $B_1$ and an output of the flyback converter is connected to the kth battery cell $B_k$. The potential of the first battery cell $B_1$ is connected to an anode terminal and the total potential of the battery string composed of k batteries is connected to a cathode terminal of the comparator 1512 within the automatic PWM generating means 1510. In order to compare the average potential of the total battery string with the potential of the individual battery cell using the comparator 1512, two input side (anode terminal and cathode terminal) of the comparator 1512 are equipped with the resistor $R_{k,U}$, $R_{k,L}$ to compare the average potential of total battery string and the potential of the individual battery cell. For the purpose of it, a relation of $R_{k,U}=(k-1)\times R_{k,L}$ is established. In the charge equalization apparatus of FIG. 15, the PWM signal is generated by the automatic PWM generating means 1510 if the potential of the first battery cell $B_1$ is higher than that of the total k batteries. The generated PWM signal is input to the switch $Q_k$ to operate the flyback converter $T_k$. As a result, the energy of over-charged first battery is entered into total battery string due to operation of the flyback converter.

Hereinafter, the automatic charge equalization method will be described more specifically.

A automatic charge equalization method for a charge equalization apparatus for a series-connected battery string comprising a battery string consisted of a plurality of batteries connected in series; an automatic PWM generating means including a comparator connected in parallel to each of the batteries composing the battery string; and a charge equalizer including a DC/DC converter connected in parallel to each of the batteries composing the battery string, comprises steps of:

(a) automatically generating a PWM signal by comparing a potential of nth battery cell composing the battery string with an average potential of the battery string of m (localized average potentials) which is one portion of the battery string and has m battery cells including the nth battery cell connected in series; and (b) controlling the charge equalizer to charge or discharge the nth battery cell under a control of the PWM signal.

(where, the nth battery cell refers to any single battery of the plurality of series-connected batteries composing the battery string, and the m is at least 3 and up to the number (k) of total batteries composing the battery string.)

The operation of the DC/DC converter is controlled to be started and stopped according to the PWM signal in the step (b) and the PWM signal is automatically generated by an output of the comparator, so that the operation of the DC/DC converter is stopped if the potential of the nth battery cell is similar to the average potential of the battery string of m (localized average potentials).

The nth battery cell is carried out to be charged and discharged by operating a charge-type DC/DC converter or a discharge-type DC/DC converter, and an input or an output of the DC/DC converter is connected to the battery string of m, so that charging current of the nth battery cell is caused by total potential of the battery string of m and discharging current of the nth battery cell serves as total potential of the battery string of m.

In the step (a), two inputs of the comparator are a potential of the nth battery cell and an average potential of the batteries composing the battery string of m respectively, and the average potential of the battery string of m is compared with the potential of the nth battery cell using resistors connected to the two inputs respectively.

The charge equalization method according to the present invention is characterized in that the nth battery cell can generate a plurality of localized average potentials and contribute total potential of the battery string, since the nth battery cell belongs to a plurality of battery strings of m and the comparator within the automatic PWM generating means connected in parallel to the battery cell located in an end portion of the batteries composing the battery string compares the total potential of the battery string with the potential of the battery cell located in an end portion.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A charge equalization apparatus for a series-connected battery string, comprising:

a battery string comprised of k batteries connected in series;

a battery string of m which is one portion of the battery string of k batteries, wherein the battery string of m has m battery cells including an nth battery cell connected in series;

an automatic PWM generating means connected in parallel to each of the batteries comprising the battery string; and a charge equalizer connected in parallel to each of the batteries comprising the battery string, wherein:

$3 \leq m \leq k$; and each automatic PWM generating means comprises:

a comparator and a PWM generator automatically generating a PWM signal in response to an output of the comparator, the comparator generates the output by comparing a potential of the nth battery cell with an average potential of the battery string of m, and the charge equalizer is automatically controlled to charge or discharge the nth battery cell according to the PWM signal automatically generated by the PWM generator.

2. The charge equalization apparatus according to claim 1, wherein two inputs of the comparator are at the potential of the nth battery cell and the average potential of the batteries composing the battery string of m.

3. The charge equalization apparatus according to claim 2, wherein the average potential of the battery string of m is determined using a resistor coupled to one of the inputs to the comparator.

4. The charge equalization apparatus according to claim 1, wherein the charge equalizer connected in parallel to each battery of the battery string comprises a DC/DC converter.

5. The charge equalization apparatus according to claim 4, wherein the DC/DC converter is a charge-type converter and has a total potential of the potential of the battery string of m as an input.

6. The charge equalization apparatus according to claim 5, wherein the automatic PWM generating means generates the PWM signal if the potential of the nth battery cell is lower than the average potential of the battery string of m.

7. The charge equalization apparatus according to claim 4, wherein the DC/DC converter is a discharge-type DC/DC converter.

8. The charge equalization apparatus according to claim 7, wherein the automatic PWM generating means generates the PWM signal if the potential of the nth battery cell is higher than the average potential of the battery string of m.

9. The charge equalization apparatus according to claim 4, wherein the DC/DC converter is operated under a control of the automatic PWM generating means.

10. The charge equalization apparatus according to claim 1, wherein the nth battery cell belongs to each of the battery string of m in a range of at least 1 to up to m.

11. The charge equalization apparatus according to claim 10, wherein two inputs of the comparator provided in a battery cell located in an end portion of the battery string are at a potential of the battery cell and an average potential of the batteries comprising the battery string.

12. A charge equalization method for a charge equalization apparatus for a series-connected battery string comprising a battery string that includes k batteries connected in series, an automatic PWM generating means including a comparator connected in parallel to each of the batteries comprising the battery string, and a charge equalizer including a DC/DC converter connected in parallel to each of the batteries comprising the battery string, the method comprising the steps of:

(a) automatically generating a PWM signal by comparing a potential of the nth battery cell comprising the battery string with an average potential of a battery string of m which is one portion of the battery string and has m battery cells connected in series including the nth battery cell; and (b) controlling the charge equalizer to charge or discharge the nth battery cell according to the PWM signal, wherein $3 \leq m \leq k$.

13. The charge equalization method according to claim 12, wherein the operation of the DC/DC converter is controlled to be started and stopped according to the PWM signal in the step (b).

14. The charge equalization method according to claim 13, wherein the nth battery cell is charged or discharged by operating a charge-type DC/DC converter or a discharge-type DC/DC converter.

15. The charge equalization method according to claim 14, wherein an input or an output of the DC/DC converter is connected to the battery string of m so that charging energy of the nth battery cell is caused by a total potential of the battery string of m and discharging current of the nth battery cell charges the battery cells of the battery string of m.

16. The charge equalization method according to claim 12, wherein the PWM signal generated by the automatic PWM generating means is controlled according to an output of the comparator in the step (a).

17. The charge equalization method according to claim 12, wherein two inputs of the comparator are at the potential of the nth battery cell and an average potential of the batteries comprising the battery string of m respectively, and the average potential of the battery string of m is determined using resistors.

18. The charge equalization method according to claim 17, wherein the automatic PWM generating means generates the PWM signal in step (a) if a potential of the nth battery cell is higher than an average potential of the battery string of m.

19. The charge equalization method according to claim 17, wherein the automatic PWM generating means generates the PWM signal in step (a) if a potential of the nth battery cell is lower than an average potential of the battery string of m.

* * * * *